United States Patent [19]

Pageaud et al.

[11] Patent Number: 5,051,862

[45] Date of Patent: Sep. 24, 1991

[54] METALLIZED FLEXIBLE DIELECTRIC FILM CAPACITOR AND METHOD FOR MAKING SUCH A CAPACITOR

[75] Inventors: Michel Pageaud; Thierry Feral, both of Seurre, France

[73] Assignee: Compagnie Europeenne De Composants Electroniques LCC, Courbevoie, France

[21] Appl. No.: 662,474

[22] Filed: Feb. 28, 1991

[30] Foreign Application Priority Data

Mar. 9, 1990 [FR] France .................. 90 03035

[51] Int. Cl.⁵ .................. H01G 1/13; H01G 7/00
[52] U.S. Cl. .................. 361/308; 29/25.42
[58] Field of Search .............. 361/308, 309, 310, 311, 361/312, 313; 29/25.42

[56] References Cited
U.S. PATENT DOCUMENTS

| | | |
|---|---|---|
| 3,248,620 | 4/1966 | Haft et al. .................. 361/313 |
| 3,649,892 | 12/1972 | Booe .................. 361/313 |
| 3,851,363 | 12/1974 | Booe .................. 361/308 |
| 3,967,168 | 3/1976 | Christensen .................. 361/323 |
| 4,613,518 | 9/1986 | Ham et al. .................. 29/25.42 |

FOREIGN PATENT DOCUMENTS 2289042 1/1989 France .

Primary Examiner—Donald A. Griffin
Assistant Examiner—Le Nguyen
Attorney, Agent, or Firm—Roland Plottel

[57] ABSTRACT

A stacked or coiled type of metallized flexible dielectric film capacitor is made by the direct superimposition of at least two metallized films, laterally offset with respect to one another so as to form alternating even-order and odd-order layers, designed to be connected to one another by lateral electrical connections. One of the faces of the films is entirely metallized and the gap between two same-order layers is filled with an insulator material itself covered by the lateral electrical connections.

10 Claims, 4 Drawing Sheets

STEP 1

STEP 2

STEP 3

WHEEL WITH WINDING

STEP 4

METAL SPRAYING

STEP 1

STEP 2

STEP 3

WHEEL WITH WINDING

STEP 4

SPRAYING OF INSULATOR

METAL SPRAYING

／5,051,862

METALLIZED FLEXIBLE DIELECTRIC FILM CAPACITOR AND METHOD FOR MAKING SUCH A CAPACITOR

BACKGROUND OF THE INVENTION

1. Field of the Invention

The present invention relates to stacked or coiled type metallized flexible dielectric film capacitors as well as to a method for making these capacitors.

2. Description of the Prior Art

The fabrication of metallized, flexible dielectric film capacitors is well known to those skilled in the art. As shown in FIG. 1, which pertains to the main steps in the fabrication of a stacked type of metallized, flexible dielectric film capacitor, this fabrication can be divided into several main steps. Step 1 consists in the metallization of a substantially wide flexible, dielectric film which may be a polyester, polycarbonate, polysulfone or polypropylene film. The metallization is done by a process of evaporation under vacuum. At present, this metallization of the film is done with non-metallized margins that are obtained during the process of evaporation under vacuum by providing for masking bands as represented in FIG. 1 by the reference C.

In a second step, the substantially wide metallized film is cut out into rolls of film of a desired width. To be capable of being used in the fabrication of capacitors, these rolls of film should be constituted by even or odd rolls of film. To obtain these even or odd rolls of film, as shown in the step 2 of FIG. 1, the substantially wide metallized film should be cut out in the middle of the margins m and in the middle of the metallized part m' between two margins, as shown respectively by the references A and A' in FIG. 1.

During the step 3, the two films, f, f', which are the even film and the odd film respectively, are wound on a large diameter wheel referenced R. As shown by the reference S, the winding of the even and odd films is done by creating an offset between the two films called a projection or projecting part d. This winding on a large-diameter wheel enables a parent capacitor to be obtained. Then, in a known manner, during the step 4, a metallization is sprayed on each side of the parent capacitor thus made so as to set up the lateral electrical connections. The metallization is preferably done by Schoop's metal spraying process. As shown in FIG. 1, this Schoop's metal spraying process enables the connection, on one side, of the even films referenced f and, on the other side, of the odd films referenced f'.

Once all these operations are over, therefore, a parent capacitor is obtained. The parent capacitor is then cut out so that individual capacitors are obtained, as shown in FIGS. 2A and 2B. This capacitor is generally parallelepiped shaped. It is formed by a stacking of alternating even-order and odd-order layers referenced 1 and 2. Each layer is formed by a dielectric-forming flexible plastic film. On one of its faces, each dielectric film has a metallized zone 7 and a non-metallized lateral margin 3 with a width m. Furthermore, as shown in FIGS. 2, electrical connections have been deposited on each of the lateral faces 4, 5 of the capacitor. These lateral connections enable the electrical and mechanical connection of the metallized zones of all the layers of the same order by respectively connecting the parts 6 and the parts 8 of the metallized zones. In this case, therefore, we obtain an active width a for the capacitor. This width corresponds to the facing part between two successive metallized zones. This width a is bordered, on each side, by a width m corresponding to the lateral margin of each film, namely the non-metallized part. This margin is necessary in the fabrication method used in order to avoid short-circuits between the even and odd layers that might be connected during the Schoop metal spraying process or the electric arc at the instant of the charging or discharging, said arc generating a high current that favors the peak effects of the thin metallized edge. Furthermore, on the capacitor, there is a distance d, on each side, called a projecting portion or projection. This distance d results from the fact that the winding of the metallized films is done with two films that have a slight lateral offset with respect to each other. In the methods used at present, the margin m has a width of about 4/10th while the projection d has a width of 1/10th to 2/10th.

This lateral margin, which is necessary for the making of the capacitors according to the method described with reference to FIG. 1, is by nature a width on a non-active film. This therefore means that there is a volume, on the component, that cannot be used by the user. Furthermore, the method implemented to make these capacitors has a number of drawbacks. For, it is necessary to make margins that may have very small widths. This calls for techniques of ever greater sophistication. In addition, the centering of the margins during the metallization of the large-width dielectric film is a delicate operation. The masks used to make the margins are increasingly brittle and costly: this is notably so for the masks used for margins of small width. Furthermore, when the substantially wide metallized film is being cut out, the centering of the knives in the metallized part and in the non-metallized part should be done with high precision. Moreover, it is necessary to identify and manage the film rolls in order to know what they are intended to be i.e. to know whether they are even film rolls or odd film rolls.

The present invention is therefore aimed at overcoming these drawbacks by proposing the making of stacked or coiled type metallized flexible dielectric film capacitors that no longer use metallized films with margins.

SUMMARY OF THE INVENTION

The present invention is also aimed at providing a new method for the fabrication of these capacitors that is far simpler to implement.

Consequently, an object of the present invention is a stacked or coiled type of metallized flexible dielectric film capacitor, made by the direct superimposition of at least two metallized films, laterally offset with respect to one another so as to form alternating even-order and odd-order layers, designed to be connected to one another by lateral electrical connections, wherein one of the faces of the films is entirely metallized and wherein the gap between two same-order layers is filled with an insulator material covered by the lateral electrical connections.

According to a preferred embodiment, the insulator used in this case is formed by an epoxy powder, a polyamide or a silicone varnish. In the same way, the lateral electrical connections are metallizations deposited by Schoop's metal spraying process.

The present invention also concerns a method for the fabrication of a capacitor as described here above, wherein said method comprises the following steps:

the metallization of a substantially wide flexible dielectric film throughout its width;

the cutting out of the film into film rolls with a desired width;

the winding of two metallized films, laterally offset with respect to each other to form alternating even-order and odd-order layers;

the filling of at least the gap between two same-order layers with an insulator;

the application of Schoop's metal spraying to the lateral sides to make the lateral electrical connections.

According to a preferred embodiment, the filling of at least the gap between two same-order layers with an insulator is done by Schoop's metal spraying, said metal spraying being preferably done by the spraying of the insulator in the flame of a torch by using the projecting part of the same-order layers as a mask.

BRIEF DESCRIPTION OF THE DRAWINGS

Other characteristics and advantages of the present invention will appear from the following description of a preferred embodiment of a capacitor according to the present invention, said description being made with reference to the appended drawings, of which.

DETAILED DESCRIPTION OF THE INVENTION

The present invention shall be described with reference to the fabrication of a stacked type of metallized flexible dielectric film capacitor. However, it is clear to those skilled in the art that the present invention can also be applied to the coiled type of metallized flexible dielectric film capacitors. In this case, the winding is done on a spindle or similar device so that an individual capacitor is made directly. Furthermore, to simplify the description, the same elements bear the same references in the figures.

Figure 1:
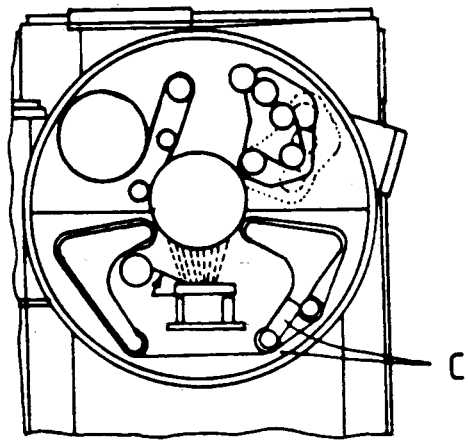
FIG. 1, already described, shows a schematic view of the different steps of a method for the fabrication of a prior art stacked type of metallized, flexible dielectric film capacitor.
Figure 1:
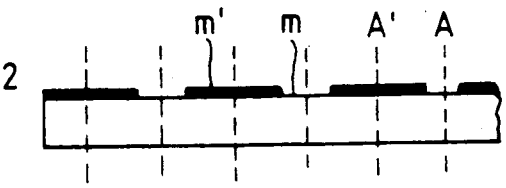
Figure 1:
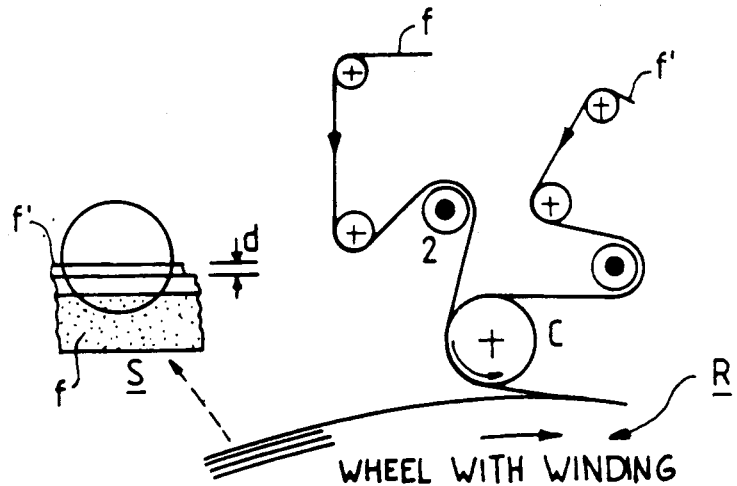
Figure 1:
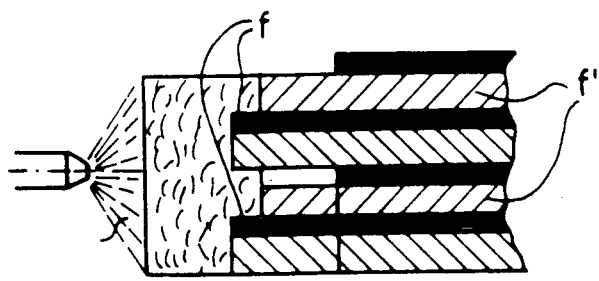
Figure 2A:
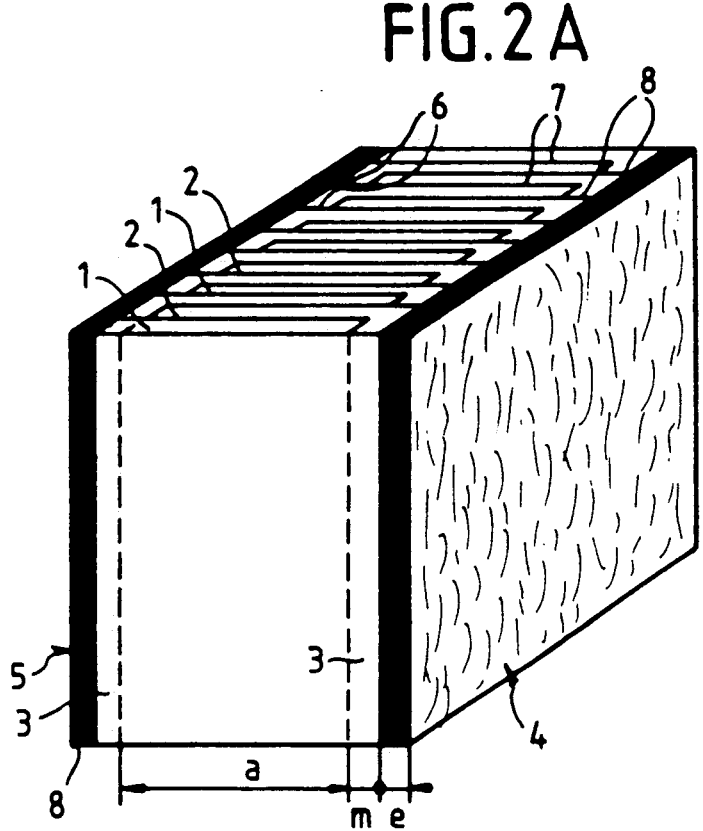
FIGS. 2A and 2B respectively show a view in perspective and a sectional view of a stacked type of capacitor obtained by the method of FIG. 1.
Figure 2B:
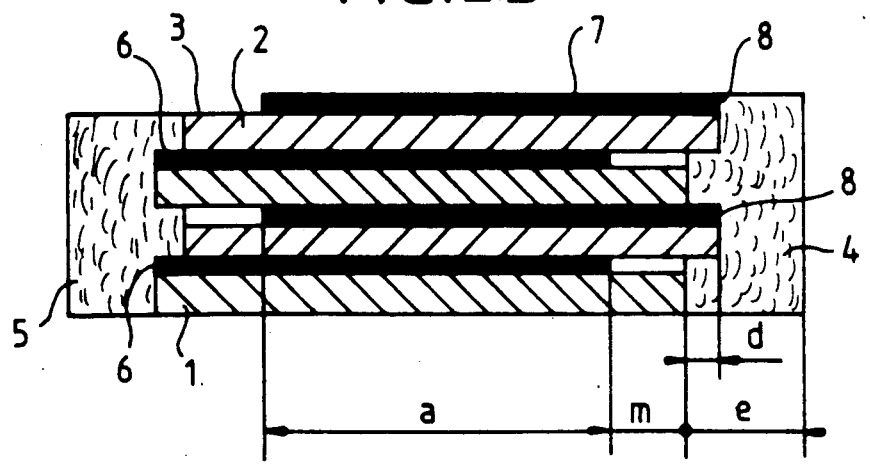
Figure 3:
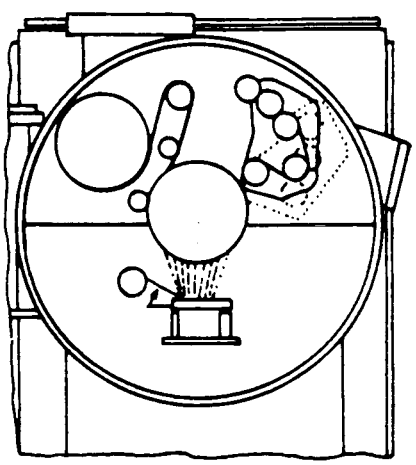
FIG. 3 shows a schematic view of the main steps of the method for the fabrication of a metallized, flexible dielectric film according to the present invention.
Figure 3:
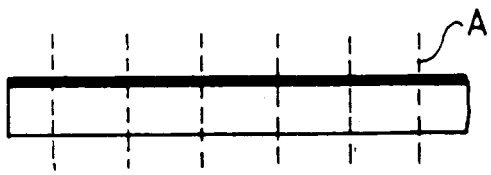
Figure 3:
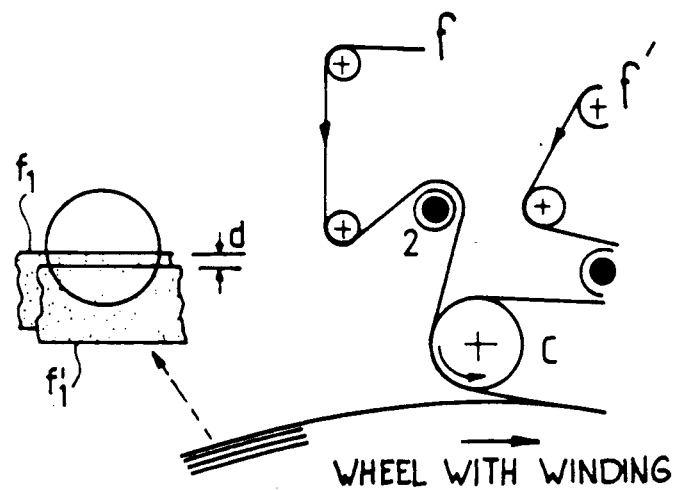
Figure 3:
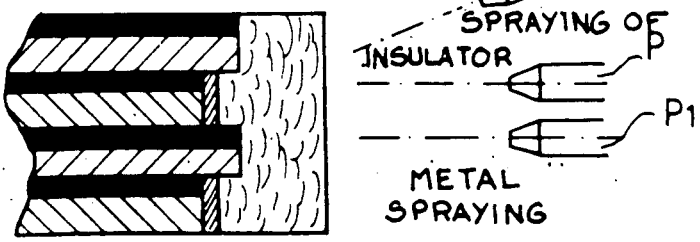

As shown in FIG. 3, the method according to the present invention has a step 1 in which the substantially wide plastic film, constituted by a film made of polyester, polycarbonate, polysulfone, polypropylene or similar material, is metallized throughout its width. This metallization is done, for example, by evaporation of the metal in a known type of machine for evaporation under vacuum. The metal is preferably aluminium, zinc, tin or an alloy based on these metals. This machine therefore no longer has a system to bring masking bands before the metal evaporation device. In a second step, the metallized plastic film is cut out into film rolls as shown in the step 2 in FIG. 3. Thus cutting operation is done without its being necessary to monitor the centering of the knives in the margins since, in accordance with the present invention, the margins are non-existent. The cutting-out axes A are therefore far easier to position. Furthermore, the film rolls no longer have to be sorted out into even or odd film rolls: this makes it far simpler to handle them.

In a third step, therefore, two plastic films are wound on a wide-diameter wheel to obtain a parent capacitor necessary for the fabrication of stacked type capacitors. This winding operation is done by offsetting the two metallized films f,f' by a distance d called a projection or projecting portion. In the context of the present invention, the projection d is greater than the projection d used in the prior art. However, this projection d remains smaller than the width formed by the former projection plus the margin in the prior art method. Consequently, the active width a of the capacitor is itself also greater, thus providing for a gain in the active volume as shall be seen more clearly in referring to FIG. 4. Once the parent capacitor has been made on the coil, the step 4 is undertaken. In this step, first of all, insulator is sprayed in the gap between two same-order films or projections. This spraying of insulator can be done by Schoop's metal spraying, by using a torch P. The insulator used is preferably constituted by an epoxy powder, a polyamide or a silicone varnish. It should withstand a temperature of about 100° C. to 150° C. and have sufficient viscosity to form a layer in the projecting portion without, however, running in between the different layers of film. The spraying of the insulator is done, preferably, by using the projecting dielectric films as masks, as indicated by the reference P'. Once the insulator is inserted in the gap between two projecting same-order films, the sides of the parent capacitor are subjected to Schoop's metal spraying in a known way, by the spraying of a metallization P1, so as to obtain the lateral electrical connections.

Figure 4:
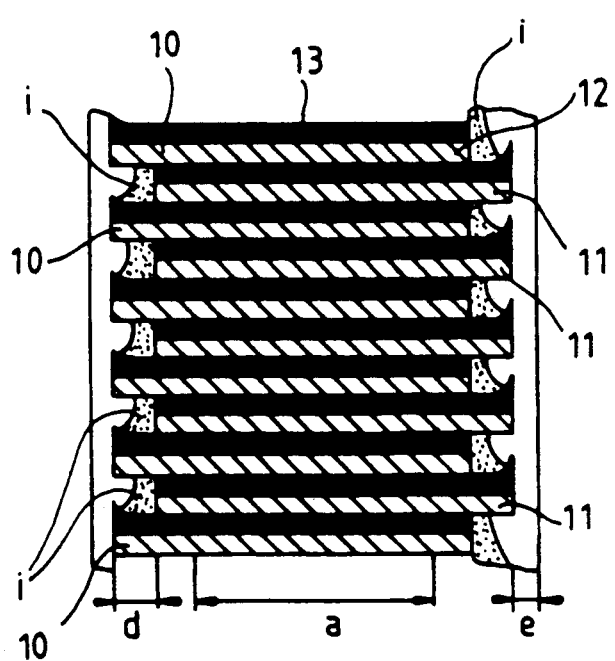
FIG. 4 is a sectional view of a capacitor obtained by the method of FIG. 3.

In this case, capacitors such as the ones shown in FIG. 4 are obtained. The blocks shown in FIG. 4 are formed essentially by a stacking of an even number of layers 10, 11. The layers are constituted by a plastic film 12 covered on one of its faces with a metallization 13. In accordance with the present invention, an insulator i has been deposited on each side of the stack of the layers in the gap between two projecting layers. On this insulator, the lateral electrical connections represented by the layer e are made in a known way by Schoop's metal spraying. As shown in FIG. 4, the active width a corresponding to the facing part between two successive metallized zones is, in this case, greater than the active width of the prior art capacitors, and this is so even when the projection d is increased so as to enable the insertion of the insulator as shown in FIG. 4.

In the foregoing, we have described a preferred method for the fabrication of a stacked type of metallized, flexible dielectric film capacitor. It is clear to those skilled in the art that other techniques may be used, notably to fill the gaps with insulator. Thus it is possible to consider plunging the parent capacitor coils in the insulator so as to form said layers, with the insulator that overflows on to the projecting layers being eliminated during the spraying of the lateral metallizations. This step can also be carried out by painting or by similar methods.

What is claimed is:

1. A stacked or coiled type of metallized flexible dielectric film capacitor, made by the direct superimposition of at least two metallized films, laterally offset with respect to one another so as to form alternating even-order and odd-order layers, designed to be connected to one another by lateral electrical connections, wherein one of the faces of the films is entirely metallized and wherein the gap between two same-order layers is filled with an insulator material covered by the lateral electrical connections.

2. A capacitor according to claim 1, wherein the insulator used in this case is formed by an epoxy powder, a polyamide or a silicone varnish.

3. A capacitor according to claim 1, wherein the lateral electrical connections are metallizations deposited by Schoop's metal spraying process.

4. A capacitor according to claim 1, wherein the film is a polyester, polycarbonate, polysulfone or polypropylene film.

5. A capacitor according to claim 1, wherein the film is metallized by aluminium, zinc, tin or an alloy based on these metals.

6. A method for the fabrication of a capacitor according to claim 1, wherein said method comprises the following steps:

the metallization of a substantially wide flexible dielectric film throughout its width;

the cutting out of the film into rolls of film with a desired width;

the winding of two metallized films, laterally offset with respect to each other, to form alternating even-order and odd-order layers;

the filling of at least the gap between two same-order layers with an insulator;

the application of Schoop's metal spraying to the lateral sides to make the lateral electrical connections.

7. A method according to claim 6 wherein, in the case of a stacked type capacitor, the winding is done on a large-diameter wheel so as to obtain a parent capacitor.

8. A method according to claim 6 wherein, in the case of the coiled type capacitor, the winding is done on a spindle so as to obtain individual capacitors.

9. A method according to claim 6, wherein the filling of at least the gap between two same-order layers with an insulator is done by Schoop's metal spraying.

10. A method according to claim 9, wherein the Schoop's metal spraying is done by the spraying of the insulator in the flame of a torch by using the projecting part of the same-order layers as a mask.

* * * * *